US010412888B2

(12) United States Patent
Matway et al.

(10) Patent No.: US 10,412,888 B2
(45) Date of Patent: Sep. 17, 2019

(54) SYSTEM AND METHOD FOR CONTROLLING ELEVATOR SPEEDS FOR AN AGRICULTURAL HARVESTER DURING OPERATION WITHIN A STORAGE HARVESTING MODE

(71) Applicant: CNH Industrial America, LLC, New Holland, PA (US)

(72) Inventors: Michael J. Matway, Litchfield, IL (US); Craig E. Murray, Davenport, IA (US); Daenio Cleodolphi, São Paulo (BR); Carlos Visconti, São Paulo (BR)

(73) Assignee: CNH Industrial America LLC, New Holland, PA (US)

( * ) Notice: Subject to any disclaimer, the term of this patent is extended or adjusted under 35 U.S.C. 154(b) by 85 days.

(21) Appl. No.: 15/681,565

(22) Filed: Aug. 21, 2017

(65) Prior Publication Data

US 2019/0053427 A1 Feb. 21, 2019

(51) Int. Cl.
*A01D 41/14* (2006.01)
*A01D 41/127* (2006.01)
*A01D 45/10* (2006.01)
*A01D 43/08* (2006.01)
*A01D 34/00* (2006.01)

(52) U.S. Cl.
CPC ....... *A01D 41/1271* (2013.01); *A01D 43/085* (2013.01); *A01D 43/086* (2013.01); *A01D 45/10* (2013.01); *A01D 34/006* (2013.01); *A01D 41/1274* (2013.01)

(58) Field of Classification Search
CPC ............ A01D 41/1271; A01D 41/1274; A01D 41/127; A01D 45/10; A01D 61/00; A01D 61/008; A01D 34/66; A01D 34/80; A01D 43/085; A01D 42/086; A01D 34/006; G01F 1/30; G01F 1/76
USPC ......... 56/10.2 E, 10.2 R, 11.9, 63, 70; 460/1
See application file for complete search history.

(56) References Cited

U.S. PATENT DOCUMENTS 5,282,389 A * 2/1994 Faivre .................. A01D 41/127
460/1
6,272,819 B1 8/2001 Wendte et al.
6,487,836 B1 12/2002 Coers et al.
(Continued)

FOREIGN PATENT DOCUMENTS

DE 102009053316 5/2011

*Primary Examiner* — Robert E Pezzuto
(74) *Attorney, Agent, or Firm* — Patrick M. Sheldrake; Peter K. Zacharias

(57) ABSTRACT

A method for operating a harvester may include initially operating the harvester in a discharge harvesting mode such that harvested crops are conveyed to a distal end of an elevator of the harvester and subsequently discharged from the harvester through a discharge opening defined by a storage hopper located at the distal end of the elevator. The method also includes reducing an operating speed of the elevator and blocking the discharge opening defined by the storage hopper upon receipt of an operator input associated with operating the harvester in a storage harvesting mode. Additionally, the method includes actively adjusting the operating speed of the elevator based on a crop flow parameter of the harvester as the harvested crops expelled from the distal end of the elevator are being stored within a storage volume of the storage hopper.

20 Claims, 5 Drawing Sheets

(56) References Cited

U.S. PATENT DOCUMENTS

| | | | |
|---|---|---|---|
| 6,508,049 B1* | 1/2003 | Cox | A01D 45/10 |
| | | | 56/10.2 R |
| 9,402,344 B1 | 8/2016 | Wenzel et al. | |
| 9,485,905 B2 | 11/2016 | Jung et al. | |
| 9,629,308 B2 | 4/2017 | Schpler et al. | |
| 9,763,386 B2* | 9/2017 | Holly | A01D 45/003 |
| 9,788,485 B2* | 10/2017 | Craig | A01D 41/1271 |
| 2005/0150202 A1* | 7/2005 | Quick | A01D 41/127 |
| | | | 56/10.2 R |
| 2014/0262548 A1* | 9/2014 | Acheson | G01G 11/003 |
| | | | 177/1 |
| 2015/0342118 A1 | 12/2015 | Corbett et al. | |
| 2016/0084987 A1 | 3/2016 | Dybro et al. | |
| 2016/0135365 A1 | 5/2016 | Cleodolphi et al. | |
| 2017/0071127 A1 | 3/2017 | Cracraft et al. | |
| 2017/0112060 A1 | 4/2017 | Noonam et al. | |

* cited by examiner

FIG. -1-

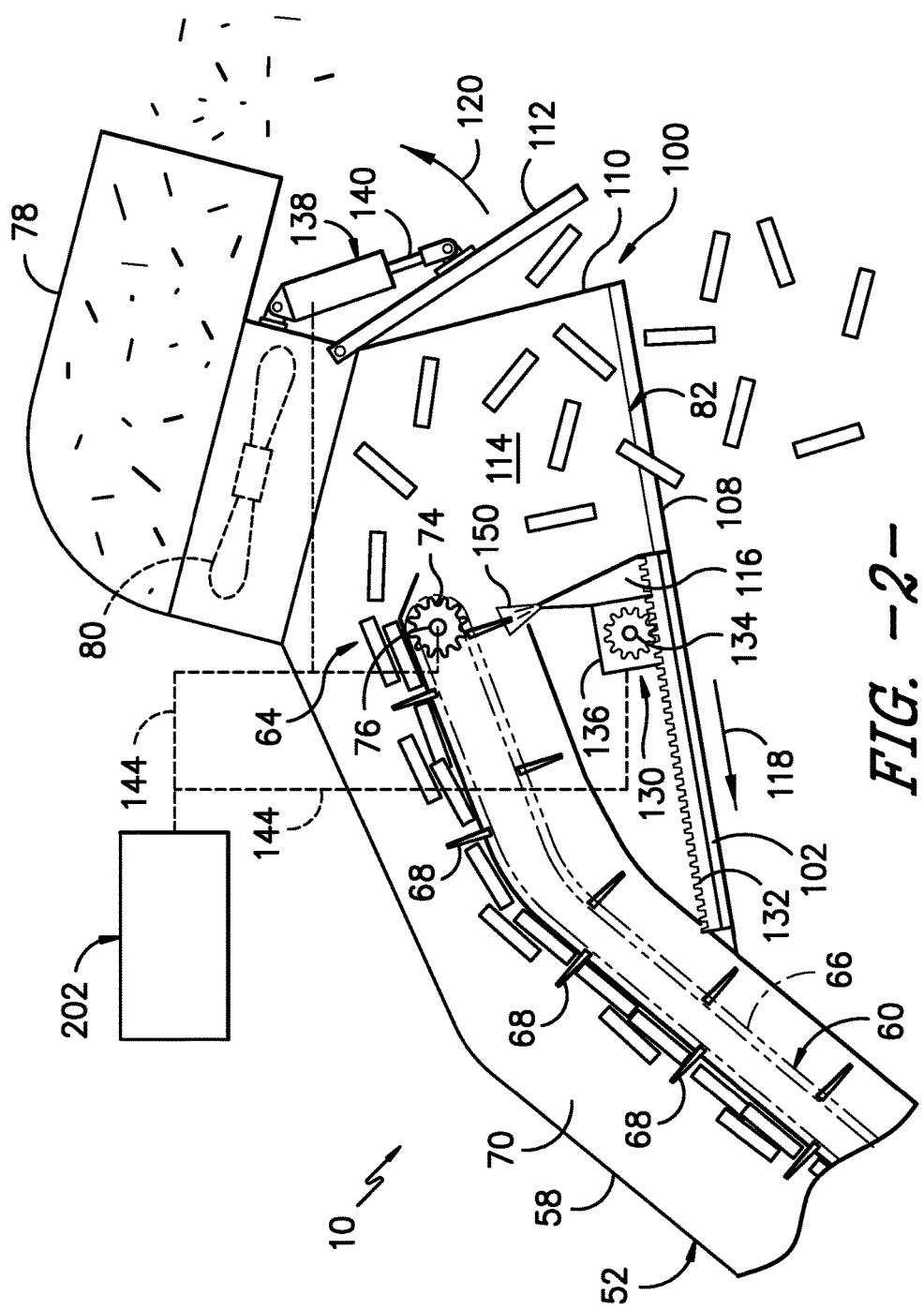
FIG. -2-

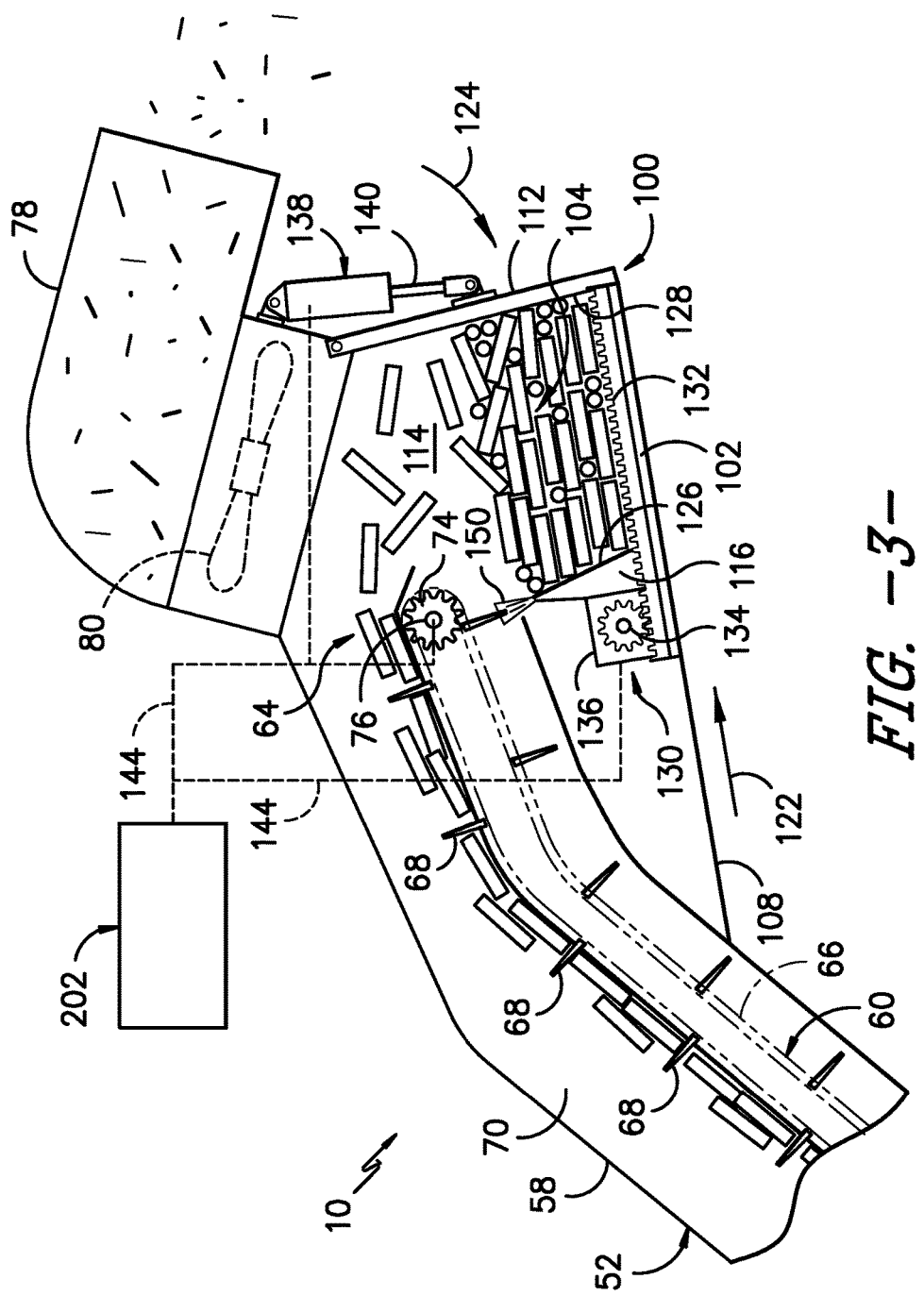
FIG. -3-

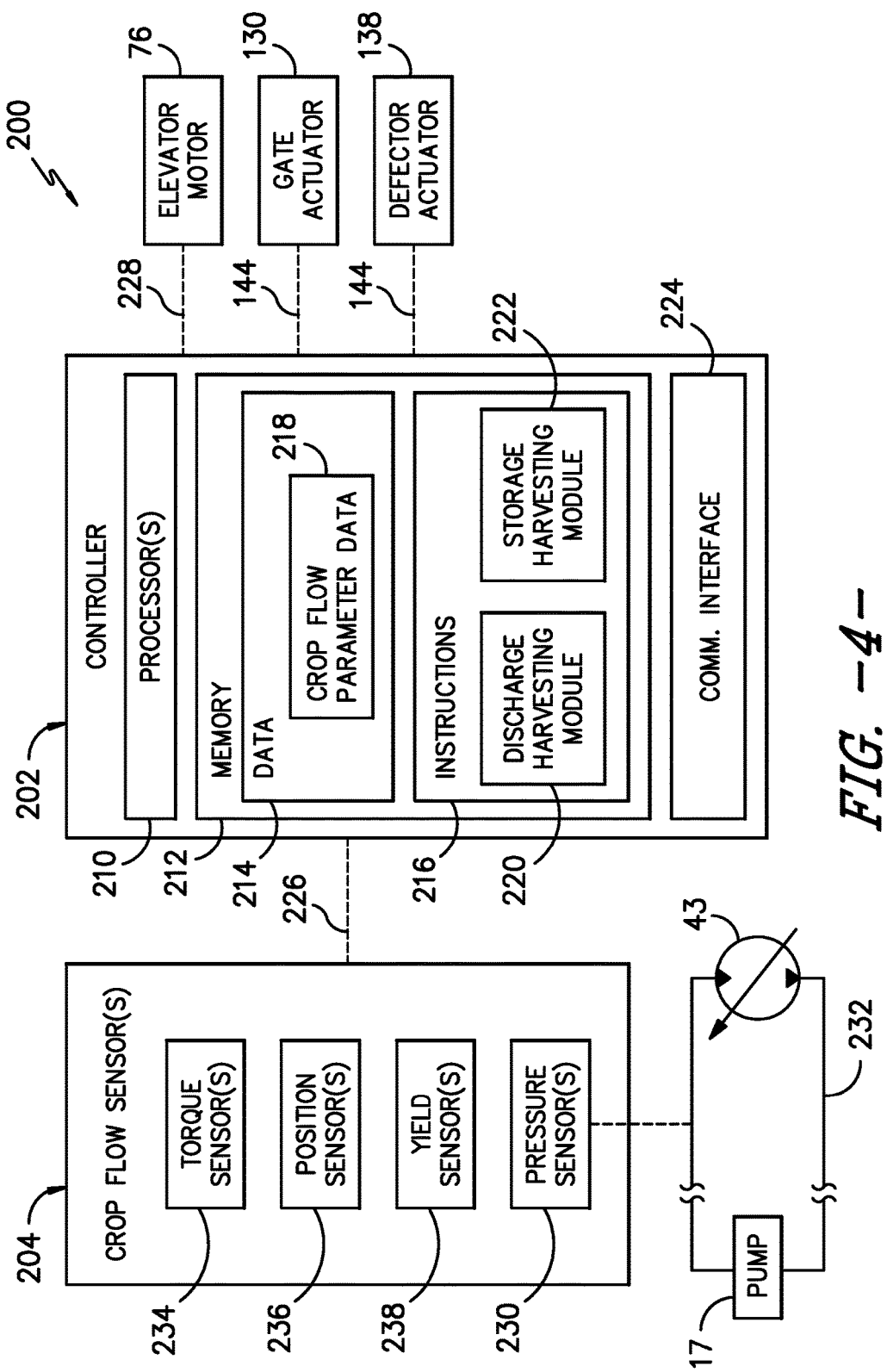
FIG. -4-

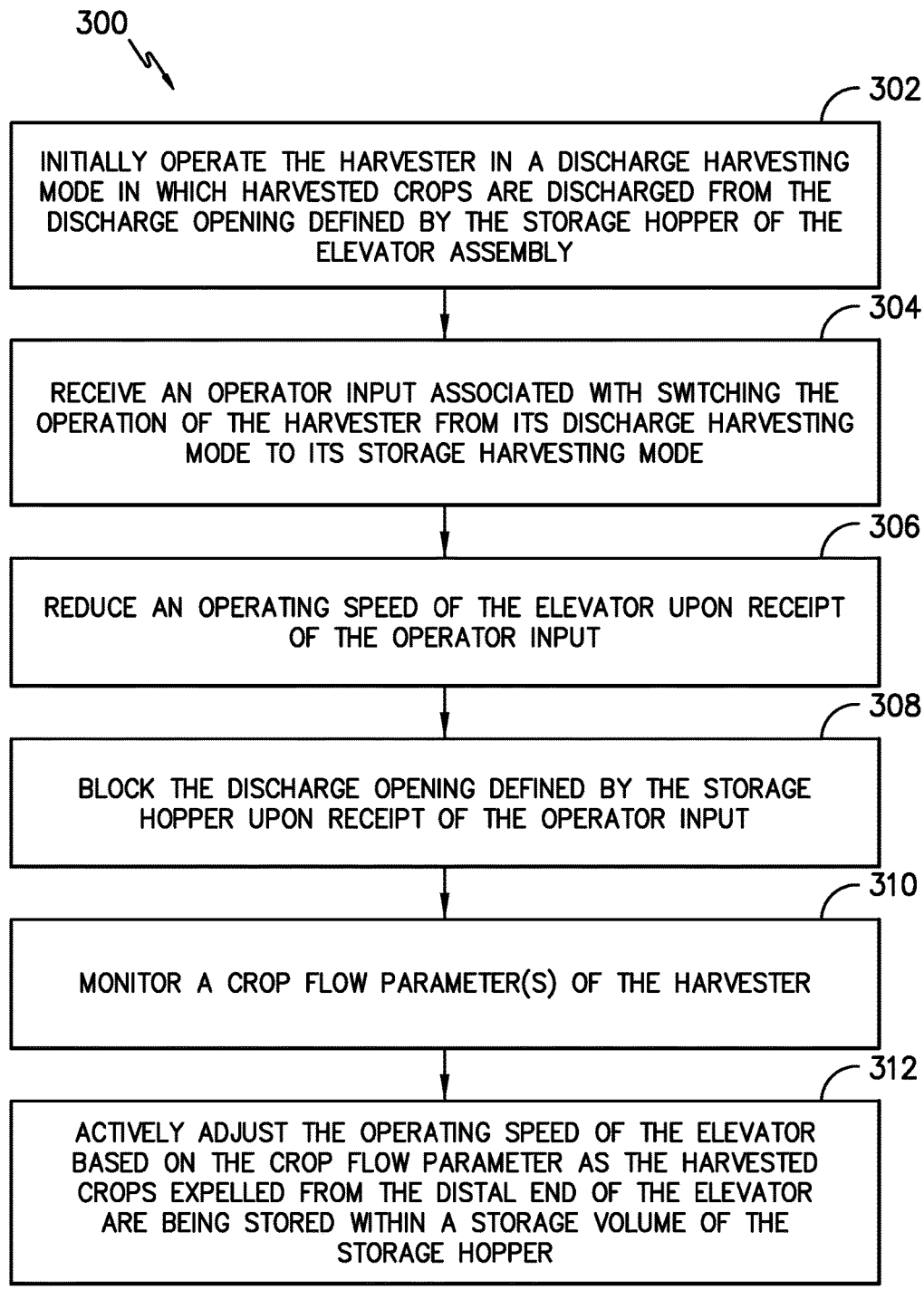
FIG. -5-

SYSTEM AND METHOD FOR CONTROLLING ELEVATOR SPEEDS FOR AN AGRICULTURAL HARVESTER DURING OPERATION WITHIN A STORAGE HARVESTING MODE

FIELD OF THE INVENTION

The present subject matter relates generally to agricultural harvesters, such as sugar cane harvesters, and, more particularly, to a system and method for controlling elevator speeds of an elevator assembly of an agricultural harvester during operation within a storage harvesting mode.

BACKGROUND OF THE INVENTION

Typically, agricultural harvesters are accompanied by a receiver for harvested crops, such as a truck that is driven beside or behind the harvester, or a wagon towed by a truck or tractor. An unloading conveyor or elevator extends from the harvester and is operable during the harvesting operation as it moves along the field for unloading the harvested crops to the accompanying receiver.

Some harvesters, particularly combine harvesters, have an on-board crop carrying capability, such as a large grain tank, so as to not need to be constantly accompanied by a receiver for the harvested crops. Other harvesters have only limited on-board carrying capability and require substantially constant accompaniment by an external receiver or storage device. For instance, sugar cane harvesters have an elongate, upwardly inclined elevator that utilizes one or more circulating chains to convey paddles or other crop carrying elements upwardly along an upwardly facing top span of the elevator, and downwardly along a downwardly facing bottom span of the elevator in an endless loop. Harvested sugar canes are typically cut into shorter billets and then carried by the paddles upwardly along the top span of the elevator and for subsequent discharge from the distal end of the elevator into the accompanying receiver, such as a billet cart.

When an external receiver for a sugarcane harvester is absent or is otherwise not properly positioned relative to the harvester, the unloading elevator must be stopped to prevent the conveyed billets from being discharged onto the ground. This situation can arise under a variety of conditions, such as if the accompanying receiver is full and must leave the harvester to unload. As another example, the receiver may often be a towed wagon that (along with its towing vehicle) defines a larger turning radius that the harvester itself. In such instances, when a turn is being executed at the end of the field, the receiver may not be immediately present for receiving the harvested crops. As a result, the harvester may have to pause operation until the receiver is able to be properly positioned relative to the harvester. In either situation, there is significant loss in the productivity of the harvester.

Accordingly, an improved system and method that allows the harvester to continue harvesting in the absence of an accompanying receiver would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for operating a harvester. The method may include initially operating the harvester in a discharge harvesting mode such that harvested crops are conveyed to a distal end of an elevator of the harvester and subsequently discharged from the harvester through a discharge opening defined by a storage hopper located at the distal end of the elevator. The method also includes reducing an operating speed of the elevator and blocking the discharge opening defined by the storage hopper upon receipt of an operator input associated with operating the harvester in a storage harvesting mode. Additionally, the method includes actively adjusting the operating speed of the elevator based on a crop flow parameter of the harvester as the harvested crops expelled from the distal end of the elevator are being stored within a storage volume of the storage hopper, wherein the crop flow parameter provides an indication of a mass flow of the harvested crops through the harvester.

In another aspect, the present subject matter is directed to a system for operating a harvester. The system may include an elevator extending between a proximal end and a distal end, with the elevator being configured to carry harvested crops between its proximal and distal ends. The system may also include a storage hopper positioned adjacent to the distal end of the elevator, with the storage hopper defining a discharge opening through which harvested crops are discharged from the harvester. Additionally, the system may include a controller configured to control the operation of the elevator. The controller may include a processor and related memory. The memory may store instructions that, when implemented by the processor, configure the controller to initially operate the harvester in a discharge harvesting mode such that harvested crops are conveyed from the proximal end of the elevator to the distal end of the elevator and subsequently discharged from the harvester through the discharge opening defined by the storage hopper. Additionally, upon receipt of an operator input associated with operating the harvester in a storage harvesting mode, the controller may be configured to reduce an operating speed of the elevator and block the discharge opening defined by the storage hopper. Moreover, the controller may be configured to actively adjust the operating speed of the elevator based on a crop flow parameter of the harvester as the harvested crops expelled from the distal end of the elevator are being stored within a storage volume of the storage hopper, wherein the crop flow parameter provides an indication of a mass flow of the harvested crops through the harvester.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a simplified, side view of one embodiment of an agricultural harvester in accordance with aspects of the present subject matter;

FIG. 2 illustrates a side view of a distal portion of an elevator assembly of the harvester shown in FIG. 1, particularly illustrating components of a storage hopper of the elevator assembly at an open or discharge position(s) to allow harvested crops to be discharged from the elevator assembly in accordance with aspects of the present subject matter;

FIG. 3 illustrates another side view of the distal portion of the elevator assembly shown in FIG. 2, particularly illustrating the components of the storage hopper at a closed or storage position(s) to allow harvested crops to be temporarily stored within the storage hopper in accordance with aspects of the present subject matter;

FIG. 4 illustrates a schematic view of one embodiment of a system for operating a harvester in accordance with aspects of the present subject matter; and FIG. 5 illustrates a flow diagram of one embodiment of a method for operating a harvester in accordance with aspects of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for operating a harvester within a storage harvesting mode. Specifically, in several embodiments, an elevator assembly for an agricultural harvester may include a storage hopper at its distal end for temporarily storing harvested crops therein. For example, the storage hopper may include one or more movable hopper components configured to be moved between an open or discharge position(s), at which the harvested crops expelled from the distal end of the elevator may be discharged from the hopper into an external receiver or storage device (i.e., when operating in a discharge operating mode) and a closed or storage position(s) at which the harvested crops may be stored within a storage volume defined by the hopper (i.e., when operating in a storage harvesting mode). As such, when the external receiver or storage device is not properly positioned relative to the harvester, the hopper component(s) may be moved to the associated closed or storage position(s) to allow the harvested crops expelled from the distal end of the elevator to be stored within the storage volume of the hopper without discontinuing operation of the elevator and/or the remainder of the harvester.

Additionally, when operating in the storage harvesting mode, a controller of the disclosed system may be configured to actively adjust the operating speed of the elevator to maximize the efficiency and/or storage capacity of the system while preventing plugging of the elevator. For example, in several embodiments, the controller may be communicatively coupled to one or More crop flow sensors configured to monitor one or more operating parameters of the harvester that are indicative of or otherwise associated with the crop mass flow or throughput through the harvester. In such embodiments, the controller may be configured to actively adjust the operating speed of the elevator based on detected changes in the monitored crop flow parameter(s) to better match the elevator speed with the current or instantaneous crop throughput of the harvester. For instance, if detected changes in the monitored crop flow parameter(s) indicate that the crop mass flow has increased, the controller may be configured to increase the elevator speed to accommodate the increased crop throughput. Similarly, if detected changes in the monitored crop flow parameter(s) indicate that the crop mass flow has decreased, the controller may be configured to reduce the elevator speed to account for the decreased crop throughput.

Figure 1:
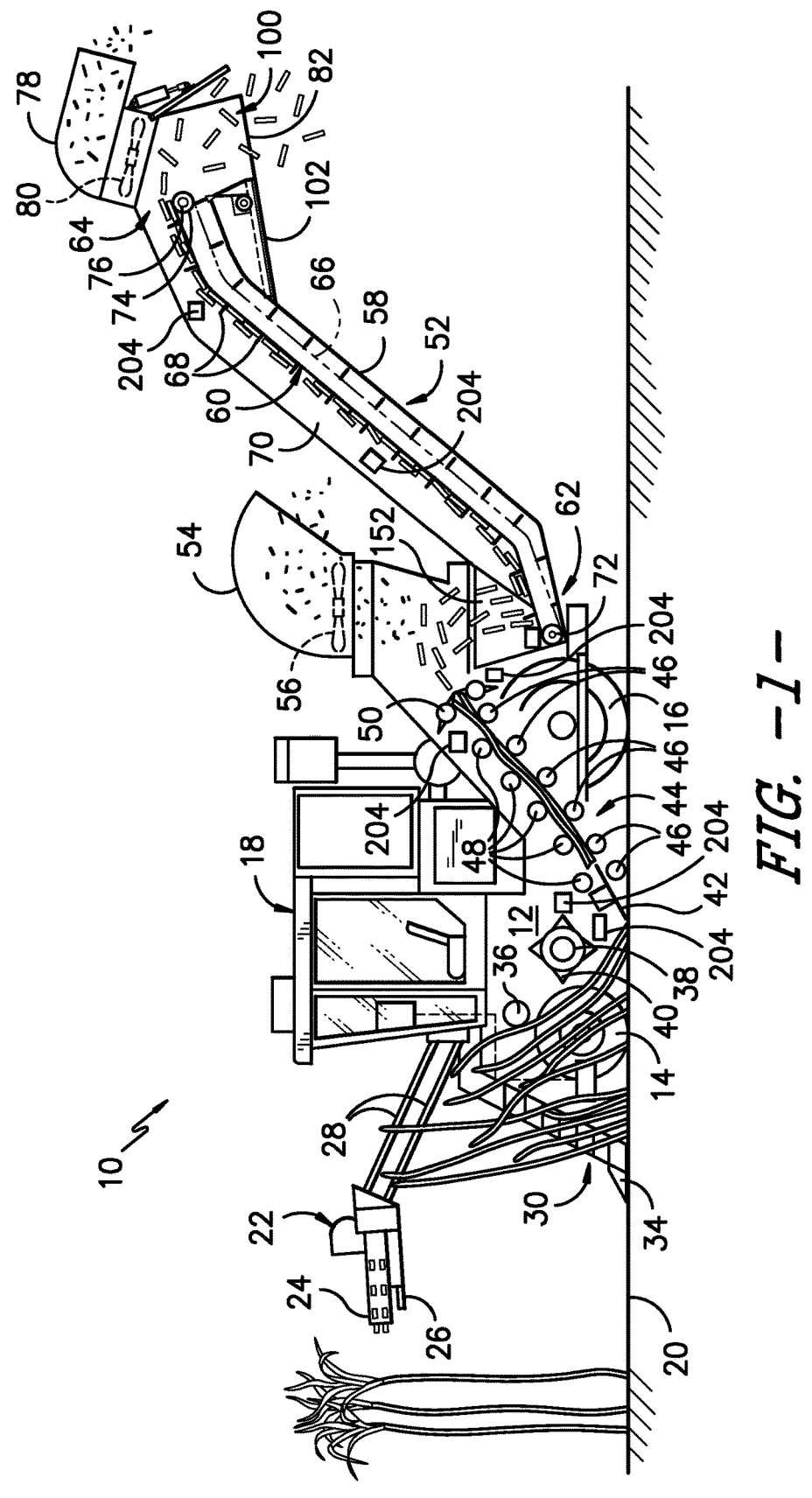

Referring now to the drawings, FIG. 1 illustrates a side view of one embodiment of an agricultural harvester 10 in accordance with aspects of the present subject matter. As shown, the harvester 10 is configured as a sugarcane harvester. However, in other embodiments, the harvester 10 may correspond to any other suitable agricultural harvester known in the art.

As shown in FIG. 1, the harvester 10 includes a frame 12, a pair of front wheels 14, a pair of rear wheels 16, and an operator's cab 18. The harvester 10 may also include a primary source of power (e.g., an engine mounted on the frame 12) which powers one or both pairs of the wheels 14, 16 via a transmission (not shown). Alternatively, the harvester 10 may be a track-driven harvester and, thus, may include tracks driven by the engine as opposed to the illustrated wheels 14, 16. The engine may also drive a hydraulic fluid pump (e.g., pump 17 shown in FIG. 4) configured to generate pressurized hydraulic fluid for powering various hydraulic components of the harvester. 10.

Additionally, the harvester 10 may include various components for cutting, processing, cleaning, and discharging sugar cane as the cane is harvested from an agricultural field 20. For instance, the harvester 10 may include a topper assembly 22 positioned at its front end to intercept sugar cane as the harvester 10 is moved in the forward direction. As shown, the topper assembly 22 may include both a gathering disk 24 and a cutting disk 26. The gathering disk 24 may be configured to gather the sugar cane stalks so that the cutting disk 26 may be used to cut off the top of each stalk. As is generally understood, the height of the topper assembly 22 may be adjustable via a pair of arms 28 hydraulically raised and lowered, as desired, by the operator.

Additionally, the harvester 10 may include a crop divider 30 that extends upwardly and rearwardly froth the field 20. In general, the crop divider 30 may include two spiral feed rollers 32. Each feed roller 32 may include a ground shoe 34 at its lower end to assist the crop divider 30 in gathering the sugar cane stalks for harvesting. Moreover, as shown in FIG. 1, the harvester 10 may include a knock-down roller 34 positioned the front wheels 14 and a fin roller 38 positioned behind the knockdown roller 36. As the knock-down roller 36 is rotated, the sugar cane stalks being harvested are knocked down while the crop divider 30 gathers the stalks from agricultural field 20. Further, as shown in FIG. 1, the fin roller 38 may include a plurality of intermittently mounted fins 40 that assist in forcing the sugar cane stalks downwardly. As the fin roller 38 is rotated during the harvest, the sugar cane stalks that have been knocked down by the knock-down roller 36 are separated and further knocked down by the fin roller 38 as the harvester 10 continued to be moved in the forward direction relative to the field 20.

Referring still to FIG. 1, the harvester 10 may also include a base cutter assembly 42 positioned behind the fin roller 30. As is generally understood, the base cutter assembly 42 may include blades (not shown) or severing the sugar cane stalks as the cane is being harvested. The blades, located on the periphery of the assembly 42, may be rotated by a hydraulic motor (e.g., hydraulic motor 43 shown in FIG. 4) powered by the vehicle's hydraulic system. Additionally, in several embodiments, the blades may be angled downwardly to sever the base of the sugar cane as the cane is knocked down by the fin roller 30.

Moreover, the harvester 10 may include a feed roller assembly 44 located downstream of the base cutter assembly 42 for moving the severed stalks of sugar cane from base cutter assembly 42 along the processing path. As shown in. FIG. 1, the feed roller assembly 44 may include a plurality of bottom feed rollers 46 and a plurality of opposed, top feed rollers 48. The various bottom and top feed rollers 46, 48 may be used to pinch the harvested sugar cane during transport. As the sugar cane is transported through the feed roller assembly 44, debris (e.g., rocks, dirt, and/or the like) may be allowed to fall through bottom rollers 46 onto the field 20. In one embodiment, one or both sets of the feed rollers 46, 48 may be rotationally driven, for example, by a hydraulic motor (e.g., hydraulic motor 43 shown in FIG. 4) powered by the vehicle's hydraulic system In addition, the harvester 10 may include a chopper assembly 50 located at the downstream end of the feed roller assembly 44 (e.g., adjacent to the rearwardmost bottom and top feed rollers 46, 48). In general, the chopper assembly 50 may be used to cut or chop the severed sugar cane stalks into pieces or "billets" which may be, for example, six (6) inches long. The billets may then be propelled towards an elevator assembly 52 of the harvester 10 for delivery to an external receiver or storage device (not shown). In one embodiment, the chopper assembly 50 may be rotationally driven, for example, by a hydraulic motor (e.g., hydraulic motor 43 shown in FIG. 4) powered by the vehicle's hydraulic system As is generally understood, pieces of debris (e.g., dust, dirt, leaves, etc.) separated from the sugar cane billets may be expelled from the harvester 10 through a primary extractor 54, which is located behind the chopper assembly 50 and is oriented to direct the debris outwardly from the harvester 10. Additionally, an extractor fan 56 may be mounted at the base of the primary extractor 54 for generating a suction force or vacuum sufficient to pick up the debris and force the debris through the primary extractor 54. The separated or cleaned billets, heavier than the debris being expelled through the extractor 54, may then fall downward to the elevator assembly 52.

As shown in FIG. 1, the elevator assembly 52 may generally include an elevator housing 58 and an elevator 60 extending within the elevator housing 58 between a lower, proximal end 62 and an upper, distal end 64. In general, the elevator 60 may include a looped chain 66 and a plurality of flights or paddles 68 attached to and evenly spaced on the chain 66. The paddles 68 may be configured to hold the sugar cane billets on the elevator 60 as the billets are elevated along a top span 70 of the elevator 70 defines between its proximal and distal ends 62, 64. Additionally, the elevator 60 may include lower and upper sprockets 72, 74 positioned at its proximal and distal ends 62, 64, respectively. As shown in FIG. 1, an elevator motor 76 maybe coupled to one of the sprockets (e.g., the upper sprocket 74) for driving the chain 66, thereby allowing the chain 66 and the paddles 68 to travel in an endless loop between the proximal and distal ends 62, 64 of the elevator 60.

Moreover, pieces of debris (e.g., dust, dirt, leaves, etc.) separated from the elevated sugar cane billets may he expelled from the harvester 10 through a secondary extractor 78 coupled to the rear end of the elevator housing 58. As shown in FIG. 1, the secondary extractor 78 may be located adjacent to the distal end 624 of the elevator 60 and may be oriented to direct the debris outwardly from the harvester 10. Additionally, an extractor fan 80 may be mounted at the base of the secondary extractor 78 for generating a suction force or vacuum sufficient to pick up the debris and force the debris through the secondary extractor 78. The separated, cleaned billets, heavier than the debris expelled through the extractor 78, may then fall from the distal end of the elevator 60. Typically, the billets may fall downwardly through a discharge opening 82 of the elevator assembly 52 into an external storage device (not shown), such as a sugar cane billet cart.

During operation, the harvester 10 is traversed across the agricultural field 20 for harvesting sugar cane. After the height of the topper assembly 22 is adjusted via the arms 28, the gathering disk 24 on the topper assembly 22 may function to gather the sugar cane stalks as the harvester 10 proceeds across the field 20, while the cutter disk 26 severs the leafy tops of the sugar cane stalks for disposal along either side of harvester 10. As the stalks enter the crop divider 30, the ground shoes 34 may set the operating width to determine the quantity of sugar cane entering the throat of the harvester 10. The spiral feed rollers 32 then gather the stalks into the throat to allow the knock-down roller 36 to bend the stalks downwardly in conjunction with the action of the fin roller 38. Once the stalks are angled downwardly as shown in FIG. 1, the base cutter assembly 42 may then sever the base of the stalks from field 20. The severed stalks are then, by movement of the harvester 10, directed to the feed roller assembly 44.

The severed sugar cane stalks are conveyed rearwardly by the bottom and top feed rollers 46, 48, which compress the stalks, make them more uniform, and shake loose debris to pass through the bottom rollers 46 to the field 20. At the downstream end of the feed roller assembly 44, the chopper assembly 50 cuts or chops the compressed sugar cane stalks into pieces or billets (e.g., 6 inch cane sections). Airborne debris or chaff (e.g., dust, dirt, leaves, etc.) separated from the sugar cane billets is then extracted through the primary extractor 54 using suction created by the extractor fan 56. The separated/cleaned billets then fall downwardly into the elevator assembly 52 and travel upwardly via the elevator 60 from its proximal end 62 to its distal end 64. During normal operation, once the billets reach the distal end 64 of the elevator 60, the billets fall through the discharge opening 82 to an external storage device. Similar to the primary extractor 54, chaff is blown out from harvester 10 through the secondary extractor 78 with the aid of the extractor fan 80.

Additionally, in accordance with aspects of the present subject matter, the elevator assembly 52 may also include a storage hopper 100 coupled to the elevator housing 58 at a location adjacent to the distal end 64 of the elevator 60 (e.g., at a location below the elevator 60 and the secondary extractor 78). As shown in FIG. 1, the storage hopper 100 may be configured to at least partially define the discharge opening 82 of the elevator assembly 52. As will be described in greater detail below, the storage hopper 100 may include a hopper gate 102 that is movable between a discharge position and a storage position. When the hopper gate 102 is located at its discharge position, the harvester 10 may be operated in its typical unloading mode (e.g., referred to hereinafter as its discharge harvesting mode) in which the billets expelled from the distal end 64 of the elevator 60 fall through the discharge opening 82 to an associated external storage device. However, when the hopper gate 102 is located at its storage position, the hopper gate 102 may cover or block the discharge opening 82 to prevent the billets from being discharged from the elevator assembly 52. In such operating mode, the billets expelled from the distal end 64 of the elevator 60 may fall into a storage volume 104 defined by the storage hopper 100 for temporary storage therein.

Moreover, in accordance with aspects of the present subject matter, the harvester 10 may also include one or more crop flow sensors 204 configured to monitor one or more crop flow parameters of the harvester 10. In general, the crop flow parameter(s) may correspond to and suitable operating parameter(s) of the harvester 10 that provides an indication of or that may otherwise be correlated to a crop mass flow or throughput of the harvested material through the harvester 10. As such, the crop flow sensor(s) 204 may generally correspond to any suitable sensor or sensing device that is configured to monitor a given crop flow parameter(s), For instance, as will be described below, the crop flow sensor(s) 204 may correspond to one or more pressure sensors for monitoring a fluid pressure of the hydraulic fluid supplied within a hydraulic circuit of the vehicle hydraulic system, one or more torque sensors for monitoring an operating torque of one or more rotating components of the harvester 10, a position sensor for monitoring the relative position of one or more components that are configured to move with changes in the crop mass flow, one or more yield sensors configured to directly or indirectly monitor the crop throughput, and/or any other suitable sensors.

Additionally, as shown in FIG. 1 and as will be described below, the crop flow sensor(s) 204 may be provided in operative association with any number of harvester components and/or installed at any suitable location within and/or relative to the harvester 10. For instance, as shown in the illustrated embodiment, one or more crop flow sensors 204 may be provided in operative association with one or more of the components of the vehicle feed train system, such as one or more components associated with the base cutter assembly 42, the feed roller assembly 44, and/or the chopper assembly 50. Alternatively, the crop flow sensor(s) 204 may be provided in operative association with any other suitable components and/or installed at any other suitable location that allows for a crop flow parameter(s) of the harvester 10 to be monitored, such as at a location within the elevator housing 58 of the elevator assembly 52.

Referring now to FIGS. 2 and 3, side views of a distal portion of the elevator assembly 52 shown in FIG. 1 are illustrated in accordance with aspects of the present subject matter, particularly illustrating the storage hopper 100 located adjacent to the distal end 64 of the elevator 60. Specifically, FIG. 2 illustrates the hopper gate 102 of the storage hopper 100 at its discharge position to allow the harvester 10 to be operated in its discharge harvesting mode. Similarly, FIG. 3 illustrates the hopper gate 102 of the storage hopper 100 at its storage position to allow the harvester 10 to be operated in its storage harvesting mode.

In several embodiments, the storage hopper 100 may be positioned at or adjacent to the distal end 64 of the elevator 60 such that billets expelled from the elevator 60 at its distal end 64 fall downwardly into the storage hopper 100. For instance, as shown in FIGS. 2 and 3, the storage hopper 100 may extend downwardly from the elevator housing 58 such that the hopper 100 includes a bottom side 108 spaced vertically apart from the elevator housing 58 at a location below the distal end 64 of the elevator 60 and a rear side 110 (FIG. 2) positioned below the secondary extractor 78.

In several embodiments, the storage hopper 100 may include a hopper gate 102 movable along the bottom side 108 of the hopper 100 and a rear deflector 112 movable relative to the rear side 110 of the hopper 100. The storage hopper 100 may also include a pair of sidewalls 114 (only one of which is shown) extending outwardly from the elevator housing 58 to the bottom and rear sides 110, 112 of the hopper 100. Additionally, as shown in FIGS. 2 and 3, the storage hopper 100 may include a front deflector 116 spaced forward of the rear side 110 of the hopper 100. In one embodiment, the discharge opening 82 of the elevator assembly 52 may be defined between the front deflector 116 and the rear deflector 112 along the bottom side 108 of the hopper 100.

As indicated above, the hopper gate 102 may be configured to be moved between a discharge position (FIG. 2) and a storage position (FIG. 3). Additionally, in one embodiment, the rear deflector 112 may be movable between an opened position (FIG. 2) and a closed position (FIG. 3). In several embodiments, when it is desired to operate the harvester 10 in its discharge harvesting mode, the hopper gate 102 may be moved to its discharge position while the rear deflector 112 may be moved to its opened position. For instance, as shown in FIG. 2, when in the discharge position, the hopper gate 102 may be moved away from the rear side 110 of the hopper 100 (e.g., in the direction of arrow 118) to expose the discharge opening 82 defined along the bottom side 108 of the hopper 100 between the front and rear deflectors 116, 112. Similarly, as shown in FIG. 2, when in the opened position, the rear deflector 112 may be pivoted relative to the rear side 110 of the hopper 100 away from both the hopper gate 102 and the front deflector 116 (e.g., in the direction of arrow 120) to enlarge the discharge opening 82. As such, harvested crop expelled from the distal end 64 of the elevator 60 may fall through the discharge opening 82 and, thus, may be discharged from the elevator assembly 52.

Moreover, when it is desired to operate the harvester 10 in its storage harvesting mode, the hopper gate 102 may be moved to its storage position while the rear deflector 112 may be moved to its closed position. For instance, as shown in FIG. 3, when in the storage position, the hopper gate 102 may be moved towards the rear side 110 of the hopper 100 (e.g., in the direction of arrow 122) to cover the discharge opening 82 defined along the bottom side 108 of the hopper 100. Similarly, as shown in FIG. 3, when in the closed position, the rear deflector 112 may be pivoted relative to the rear side 110 of the hopper 100 towards both the hopper gate 102 and the front deflector 116 (e.g., in the direction of arrow 124) until the rear deflector 112 contacts or is otherwise positioned directly adjacent to the hopper gate 102. When the hopper gate 102 and the rear deflector 112 are located at such positions, the storage hopper 100 may be configured to define a storage volume 104 for storing the harvested crop expelled from the distal end 64 of the elevator 60. Specifically, as shown in FIG. 3, the storage volume 104 may extend between a forward end 126 defined by the front deflector 116 and a rear end 128 defined by the rear deflector 112. Additionally, the storage volume 104 may extend crosswise between the opposed sidewalls 114 of the hopper 100 and vertically between the distal end 64 of the elevator 60 and the hopper gate 102. Thus, harvested crops expelled from the distal end 64 of the elevator 60 may fall down onto the bottom of the storage volume 104 defined by the hopper gate 102 and pile up vertically within the storage volume 104 between the front and rear deflectors 116, 112 and the opposed sidewalls 114.

It should be appreciated that the storage volume 104 defined by the storage hopper 100 may generally correspond to any suitable volume sufficient to store a desired amount of billets within the hopper 100. However, in several embodiments, the storage hopper 100 may be configured such that the storage volume 104 is substantially equal to the maximum storage volume defined by the top span 70 of the elevator 60 (i.e., the top side of the elevator 60 along which the billets are conveyed between the elevator's proximal and distal ends 62, 64). As used herein, the storage volume 104 defined by the storage hopper 100 may be considered to be substantially equal to the maximum storage volume defined by the top elevator span 70 if the storage volume 104 is within +/−20% of the maximum storage volume defined by the top elevator span 70, such as within +/−10% of the maximum storage volume defined by the top elevator span 70 or within +/−5% of the maximum storage volume defined by the top elevator span 70 and/or any other subranges therebetween.

Additionally, it should be appreciated that, in other embodiments, the rear deflector 112 may not be movable, but, instead, may be fixed or stationary. In such embodiments, only the hopper gate 102 may be configured to be moved to switch the operation of the harvester 10 between its discharge and storage harvesting modes. For instance, when it is desired to operate the harvester 10 in its storage harvesting mode, the hopper gate 102 may be moved towards the fixed rear deflector 112 to the storage position at which the hopper gate 102 contacts or is otherwise positioned directly adjacent to the deflector 112. Similarly, when it is desired to operate the harvester 10 in its discharge harvesting mode, the hopper gate 102 may be moved away from the rear deflector 112 to expose the discharge opening 82 of the elevator assembly 52.

As shown in FIGS. 2 and 3, in several embodiments, the elevator assembly 52 may include a gate actuator 130 configured to move the hopper gate 102 between its discharge and storage positions. In general, the gate actuator 130 may correspond to any suitable actuation mechanism and/or device. For instance, in one embodiment, the gate actuator 140 may include a gear and rack assembly for moving the hopper gate 102 between its discharge and storage positions. Specifically, as shown in FIGS. 2 and 3, the hopper gate 102 may include a rack 132 configured to engage a corresponding drive gear 134 coupled to a motor 136 (e.g., an electric motor or a hydraulic motor powered by the vehicle's hydraulic system). In such an embodiment, by rotationally driving the drive gear 134 in one direction or the other via the motor 136, the hopper gate 102 may be linearly actuated between its discharge and storage positions (e.g., as indicated by arrows 118, 122). Alternatively, the gate actuator 130 may correspond to any other suitable actuation mechanism and/or device, such as any other suitable linear actuator (e.g., a cylinder) and/or the like.

Additionally, in several embodiments, the elevator assembly 52 may include a deflector actuator 138 configured to move the rear deflector 112 between its opened and closed positions. In general, the deflector actuator 138 may correspond to any suitable actuation mechanism and/or device. For instance, in one embodiment, the deflector actuator 138 may correspond to a linear actuator, such as a fluid-driven cylinder actuator or an electric actuator (e.g., a solenoid-activated actuator). Specifically, as shown in FIGS. 2 and 3, the deflector actuator 138 may be coupled to a portion of the elevator housing 58 and/or a portion of the secondary extractor 78 and may include a drive rod 140 secured to a portion of the rear deflector 112. In such an embodiment, by linearly actuating the drive rod 140 in one direction or the other, the rear deflector 112 may be pivoted relative to the rear side 110 of the hopper 100 between its opened and closed positions. Alternatively, the deflector actuator 138 may correspond to any other suitable actuation mechanism and/or device, such as any other suitable linear actuator (e.g., a gear and rack assembly) and/or the like.

It should be appreciated that, in several embodiments, the operation of the gate actuator 130 and/or the deflector actuator 138 may be configured to be electronically controlled via a controller 202 of the harvester 10. For instance, as shown in FIGS. 2 and 3, the controller 202 may be communicatively coupled to the gate actuator 130 and the deflector actuator 138 via one or more communicative links 144, such as a wired connection and/or a wireless connection. In the event that the gate actuator 130 and/or the deflector actuator 138 corresponds to a fluid-driven component(s), the controller 202 may, instead, be communicatively coupled to suitable electronically controlled valves and/or other suitable fluid-related components for controlling the operation of the actuator(s) 130, 138. Regardless, by providing the disclosed communicative links between the controller 202 and the actuators 130, 138, the controller 202 may be configured to control the operation of the actuators 130, 138 based on inputs received from the operator of the harvester 10. For instance, as will be described below, the controller 202 may be configured to receive operator inputs associated with the desired operating mode for the harvester 10. Specifically, the operator may provide an operator input indicating the desire to switch the operation of the harvester 10 from the discharge harvesting mode to the storage harvesting mode. In such instance, the controller 202 may be configured to electronically control the operation of the actuators 130, 138 to move the hopper gate 102 to its storage position and the rear deflector 112 to its closed position. Similarly, if the operator provides an operator input indicating the desire to switch the operation of the harvester 10 from the storage harvesting mode back to the discharge harvesting mode, the controller 202 may be configured to electronically control the operation of the actuators 130, 138 to move the hopper gate 102 to its discharge position and the rear deflector 112 to its opened position.

Referring still to FIGS. 2 and 3, in several embodiments, a sealing device 150 may be provided at the top end of the front deflector 112 for sealing the gap defined between the front deflector 116 and the paddles 68 of the elevator 60 as the paddles 68 are conveyed past the deflector 116. For instance, in one embodiment, the sealing device 150 may correspond to a flexible sealing member, such as a brush seal or an elastic seal. In such an embodiment, the sealing device 150 may be configured to flex or bend as the paddles 68 are conveyed past the front deflector 116. By providing the sealing device 150, the billets stored within the storage volume 104 of the hopper 100 when the harvester 10 is operating in its storage harvesting mode may be prevented from tumbling over the top of the front deflector 116 and falling from the hopper 100.

Referring now to FIG. 4, one embodiment of a system 200 for operating a harvester is illustrated in accordance with aspects of the present subject matter. In general, the system 200 will be described herein with reference to the harvester 10 described above with reference to FIGS. 1-3. However, it should be appreciated that the disclosed system 200 may generally be utilized with harvesters having any other suitable configuration.

In several embodiments, the system 200 may include a controller 202 and various other components configured to be communicatively coupled to and/or controlled by the controller 202, such as one or more crop flow sensors 204, one or more components for controlling the operational speed of the elevator 60 (e.g., the elevator motor 76), one or more components for actuating the hopper gate and the rear deflector (e.g., the gate actuator 130 and the deflector actuator 138) and/or the like. As will be described in greater detail below, the controller 202 may be configured to control the operation of the harvester 10 such that the harvester 10 is normally operated within its discharge harvesting mode during which the billets expelled from the distal end 64 of the elevator 60 fall through the discharge opening 82 to an associated external storage device. However, upon receipt an input (e.g., an operator input), the controller 202 may be configured to transition the harvester into operation within its storage harvesting mode during which the hopper gate 102 is moved to its storage position and the rear deflector 112 is moved to its closed position to allow the billets to be temporarily stored within the storage volume 104 defined by the storage Hooper 100. Additionally, when transitioning to the storage harvesting mode, the controller 202 may be configured to initially reduce the operational speed of the elevator 60. Thereafter, the controller 202 may be configured to actively adjust the elevator speed, as desired or necessary, based on one or more monitored crop flow parameters of the harvester 10 to match the elevator speed with the current or instantaneous cross mass flow or throughput of the harvester 10, thereby maximize storage capacity within the elevator assembly 52 and the associated storage hopper 100 while preventing plugging of the elevator 60.

In general, the controller 202 may correspond to any suitable processor-based device(s), such as a computing device or any combination of computing devices. Thus, as shown in FIG. 4, the controller 202 may generally include one or more processor(s) 210 and associated memory devices 212 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 212 may generally comprise memory element(s) including, hut not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 212 may generally be configured to store information accessible to the processor(s) 210, including data 214 that can be retrieved, manipulated, created and/or stored by the processor(s) 210 and instructions 216 that can be executed by the processor(s) 210.

In several embodiments, the data 214 may be stored in one or more databases. For example, the memory 212 may include a crop flow parameter database 218 for storing data associated with one or more monitored crop flow parameters. As indicated above, the crop flow parameter(s) may generally correspond to any suitable operating parameter of the harvester 10 that provides an indication of or may otherwise be correlated to a crop mass flow or throughput of the harvested material through the harvester 10, such as hydraulic pressure(s), operating torque(s), certain component position(s), yield data, and/or the like. Thus, in several embodiments, sensor data associated with one or more such operating parameters may be stored within the crop flow parameter database 218.

In addition to such sensor data, data associated with an average crop flow parameter for the harvester 10 may be stored within the crop flow parameter database 218. For instance, in one embodiment, the controller 202 may be configured to continuously monitor the crop flow parameter(s) as the harvester 10 is being operated within its normal, discharge harvesting mode. In such an embodiment, the controller 202 may calculate a running average of the monitored crop flow parameter and store such running average within the crop flow parameter database 218.

As particularly shown in FIG. 4, to allow the controller 202 to monitor the crop flow parameter(s), the controller 202 may be communicatively coupled to one or more crop flow sensors 204. As indicated above, the crop flow sensor(s) 204 may generally correspond to any suitable sensor or sensing device that is configured to monitor a given crop flow parameter(s). For instance, in one embodiment, the crop flow sensor(s) 204 may correspond to one or more pressure sensors 230 configured to monitor a fluid pressure of the hydraulic fluid supplied to one or more hydraulic motors 43 of the vehicle's hydraulic system via an associated hydraulic circuit 232, such as the hydraulic circuit associated with the base cutter assembly 42, the feed roller assembly 44, and/or the chopper assembly 50. In such an embodiment, the hydraulic pressure within such hydraulic circuit(s) 232 may provide an indication of the mass flow of harvested materials through the harvester 10. For instance, as the mass flow through the harvester 10 increases, the load on the hydraulic system may also increase, thereby resulting in an increase in the hydraulic pressure within the associated circuit 232. Similarly, as the mass flow through the harvester 10 decreases, the load on the hydraulic system may also decrease, thereby resulting in a reduction in the hydraulic pressure within the associated circuit 232.

In another embodiment, the crop flow sensor(s) 204 may correspond to one or more torque sensors 234 configured to monitor an operating torque of one or more rotating components of the harvester 10, such as the hydraulic motor(s) 43 configured to rotationally drive the rotating blades of the base cutter assembly 42, the rollers 46, 48 of the feed roller assembly 44, and/or the chopper assembly 50. In such an embodiment, the monitored operating torque may provide an indication of the mass flow of harvested materials through the harvester 10. For instance, similar to the hydraulic pressure, as the mass flow through the harvester increases, the operating torque of the rotating component(s) may increase. Additionally, as the mass flow through the harvester decreases, the operating torque of the rotating component(s) may decrease.

In a further embodiment, the crop flow sensor(s) 204 may correspond to one or more position sensors 236 configured to monitor the relative position of one or more harvester components whose position is dependent on the mass flow or crop throughput of the harvester 10. For instance, in one embodiment, the bottom feed rollers 46 and/or the top feed rollers 48 of the feed roller assembly 44 may be configured to move relative to the opposed set of rollers 46, 48 based on the crop throughput through the feed roller assembly 44. For instance, as the crop mass flow decreases, one or both sets of the rollers 46, 48 may be configured to move inwardly towards the opposed set of rollers 46, 48 to narrow the gap defined between the rollers 46, 48. Similarly, as the crop mass flow increases, one or both sets of the rollers 46, 48 may be configured to move outwardly away from the opposed set of rollers 46, 48 to increase the spacing defined between the rollers 46, 48. As a result, by monitoring the position of one or more movable rollers 46, 48 of the feed roller assembly 44, such monitored roller position(s) may provide an indication of the crop mass flow through the harvester 10.

In yet another embodiment, the crop flow sensor(s) 204 may correspond to one or more yield sensors configured to provide an indication of the crop mass flow through the harvester 10. For instance, in one embodiment, the yield sensor(s) may correspond to one or more load cells coupled to one or more components of the harvester's structure, such as by positioning one or more load cells on and/or within the elevator assembly 52. In such an embodiment, the load cell(s) may be configured to monitor the load applied by the crop material on the adjacent harvesting structure as the crop moves through the harvester 10, thereby providing an indication of the crop mass flow. In another embodiment, the yield sensor(s) may correspond to one or more vision sensors, such as one or more cameras. In such an embodiment, the vision sensor(s) may be configured to capture images of the crop flow through the harvester 10 at one or more locations and analyze such images using suitable computer-vision processing techniques to estimate the crop mass flow through the harvester 10.

Referring still to FIG. 4, in several embodiments, the instructions 216 stored within the memory 212 of the controller 202 may be executed by the processor(s) 210 to implement a discharge harvesting module 220. In general, the discharge harvesting module 220 may be configured to control the operation of the harvester 10 such that the harvest 10 is operated within its discharge harvesting mode. Specifically, to allow for operation within the discharge harvesting mode, the controller 202 may be configured to control the relevant components of the harvester 10 (e.g., the gate actuator 130 and the deflector actuator 138) to ensure that the hopper gate 102 and the rear deflector 112 are moved to their associated discharge and opened positions, respectively (e.g., as shown in FIG. 2), thereby allowing the billets expelled from the distal end 64 of the elevator 60 to fall through the storage hopper 100 and be discharged from the elevator assembly 52 via the discharge opening 82. The billets discharged from the elevator assembly 52 may then fall into an external storage device, such as a sugar cane billet cart. In addition, when operating within the discharge harvesting mode, the controller 202 may be configured to control the operation of the elevator 60 (e.g., via control of the elevator motor 76) such that the elevator 60 is operated a given elevator speed. As will he described below, the elevator speed for the discharge harvesting mode may be greater than the elevator speed used when operating within the storage harvesting mode.

Additionally, as shown in FIG. 4, the instructions 216 stored within the memory 212 of the controller 202 may also be executed by the processor(s) 210 to implement a storage harvesting module 222. In general, the storage harvesting module 222 may be configured to control the operation of the harvester 10 such that the harvester 10 is operated within its storage harvesting mode. Specifically, to allow for operation within the storage harvesting mode, the controller 202 may be configured to control the relevant components of the harvester 10 (e.g., the gate actuator 130 and the deflector actuator 138) to ensure that the hopper gate 102 and the rear deflector 112 are moved to their associated storage and closed positions, respectively (e.g., as shown in FIG. 3) to cover or block the discharge opening 82 of the storage hopper 100, thereby allowing the billets expelled from the distal end 64 of the elevator 60 to be stored within the storage volume 104 defined by the storage hopper 100. Additionally, simultaneous with covering or blocking the discharge opening 82 (or immediately before or after such control action), the controller 202 may be configured' to reduce the operational speed of the elevator 60. For example, when initiating the storage harvesting mode, the controller 202 may be configured to reduce the operational speed of the elevator from its normal operating speed to a pre-set or predetermined default elevator speed setting. This speed setting may, for instance, correspond to a manufacturer-defined setting and/or an operator-defined setting. In addition, the default speed setting may he adjusted, as desired or necessary, by the operator to fine tune such default speed setting based the anticipated or expected pour rate of the harvester 10.

It should be appreciated that, in one embodiment, the default speed setting may generally correspond to a given percentage of the normal operational speed for the elevator 60 during operation within the discharge harvesting mode. For instance, in one embodiment, the default elevator speed setting for the storage harvesting mode may correspond to a speed that is less than about 75% of the noun& operational speed of the elevator 60 during operation within the discharge harvesting mode, such as a speed ranging from about 10% to about 50% of the normal operating speed and/or a speed ranging from about 10% to about 25% of the normal operating speed.

Once the operational speed of the elevator 60 has been reduced to the default speed setting, the storage harvesting module 222 may then be configured to continuously monitor the crop flow parameter(s) of the harvester 10 (e.g., via the crop flow sensor(s) 204) to detect changes in the crop mass flow through the harvester 10. Thereafter, the storage harvesting module 222 may be configured to actively adjust the operational speed of the elevator 60 when it is determined that a change in the crop mass flow has occurred. For instance, if it is determined based on the monitor crop flow parameter(s) that the crop mass flow through the harvester 10 has increased, the storage harvesting module 222 may be configured to increase the operational speed of the elevator (e.g., via control of the elevator motor 76). Similarly, if it is determined based on the monitor crop flow parameter(s) that the crop mass flow through the harvester 10 has decreased, the storage harvesting module 222 may be configured to reduce the operational speed of the elevator 60 (e.g., via control of the elevator motor 76). In doing so, the magnitude of the elevator speed adjustment made by the controller 202 may vary, for example, based on the magnitude of the detected change in the crop mass flow.

In one embodiment, the storage harvesting module 222 may be configured to determine when to adjust the operational speed of the elevator 60 based on a previously determined average crop flow parameter for the harvester 10. For instance, as indicated above, the controller 202 may be configured to continuously monitor the crop flow parameter(s) as the harvester 10 is operating within its discharge harvesting mode and calculate a running average for the monitor crop flow parameter(s). This running average may then be stored within the controller's memory 212 and subsequently used as a reference point for determining when to adjust the operational speed of the elevator 60. For instance, when operating in the storage harvesting mode, the storage harvesting module 222 may be configured to continuously compare the currently monitored value of the crop flow parameter(s) to the previously determined running average for such parameter(s). In such an embodiment, if the currently monitored value of the crop flow parameter exceeds the running average (or exceeds a tolerance range defined relative to the running average), the storage harvesting module 222 may be configured to increase the operational speed of the elevator 60 to accommodate the increase in crop mass flow indicated by the increased crop flow parameter value(s). Similarly, if the currently monitored value of the crop flow parameter falls below the running average (or falls below a tolerance range defined relative to the running average), the storage harvesting module 222 may be configured to reduce the operational speed of the elevator 60 to account for the decrease in crop mass flow indicated by the reduce crop flow parameter value(s). It should be appreciated that, when it is desired to define a tolerance or deadband range relative to the running average for the crop flow parameter(s) across which the elevator speed is not adjusted, the range may, for example, correspond to a parameter range that is less than or equal to +/−20% of the running average, such as less than or equal to +/−10% of the running average, or less than or equal to +/−5% of the running average.

It should be appreciated that, in one embodiment, the storage harvesting module 222 may be configured to initiate the transition between the operating nodes when an operator input is received by the controller 202 that is associated with switching the operation of the harvester 10 from its discharge harvesting mode to its storage harvesting mode. For instance, as indicated above, it may be desirable to operate the harvester 10 in its storage harvesting mode when an associated external storage device is not properly positioned relative to the discharge opening 82 for collecting the discharged billets, such as when rotating the billet carts and/or when turning/resuming harvesting at the end of row without the billet cart being in position, In such instance(s), the operator may be allowed to provide a suitable operator input to the controller 202 indicating the desire to switch operation of the harvester 10 to the storage harvesting mode. For instance, a suitable input device (e.g., a button, knob, lever, switch, etc.) may be provided within the operator's cab 18 to allow the operator to provide the operator input to the controller 202.

Moreover, as shown in FIG. 4, the controller 202 may also include a communications interface 224 to provide a means for the controller 202 to communicate with any of the various other system components described herein. For instance, one or more communicative links or interfaces 226 (e.g., one or more data buses) may be provided between the communications interface 224 and the crop flow sensor(s) 204 to allow the controller 202 to receive measurement signals from the sensor(s) 204. Similarly, one or more communicative links or interfaces 228 (e.g., one or more data buses) may be provided between the communications interface 224 and the elevator motor 76 (and/or a related component configured to control the operation of the motor 76, such as a related control valve) to allow the operation of the elevator motor 76 to be controlled by the controller 202. Additionally, as indicated above, one or more communicative links or interfaces 114 (e.g., one or more data buses) may be provided between the communications interface 224 and both the gate actuator 130 and the deflector actuator 138 (and/or a related component(s) configured to control the operation of the actuator(s) 130, 138, such as a related control valve(s)) to allow the operation of such components to be controlled by the controller 202.

Referring now to FIG. 5, a flow diagram of one embodiment of a method 300 for operating a harvester is illustrated in accordance with aspects of the present subject matter. In general, the method 300 will be described herein with reference to the embodiment of the harvester 10 described above with reference to FIGS. 1-3 and the system 200 described above with reference to FIG. 4. However, it should be appreciated by those of ordinary skill in the art that the disclosed method 300 may generally be implemented with any harvester having any suitable harvester configuration and within any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (302), the method 300 may include initially operating the harvester in a discharge harvesting mode in which harvested crops are discharged from the discharge opening defined by the storage hopper of the elevator assembly. Specifically, as indicated above, when operating in the discharge harvesting mode, the hopper gate 102 and the rear deflector 112 may be moved to their associated positions shown in FIG. 2 (e.g., the discharge position and the opened position, respectively) for allowing the billets expelled from the distal end 64 of the elevator 60 to fall through the storage hopper 100 and be discharged from the elevator assembly 52 via the discharge opening 82. The billets discharged from the elevator assembly 52 may then fall into an external storage device, such as a sugar cane billet cart.

Additionally, at (304), the method 300 may include receiving an operator input associated with switching the operation of the harvester from its discharge harvesting mode to its storage harvesting mode. For instance, as indicated above, it may be desirable to operate the harvester 10 in its storage harvesting mode when an associated external storage device is not properly positioned relative to the discharge opening 82 for collecting the discharged billets, such as when rotating the billet carts and/or when turning/resuming harvesting at the end of row Without the billet cart being in position. In such instance(s), the operator may be allowed to provide a suitable operator input to the controller 202 indicating the desire to switch operation of the harvester 10 to the storage harvesting mode.

Moreover, at (306), the method 300 may include reducing an operating speed of the elevator upon receipt of the operator input. As indicated above, when operating in the storage harvesting mode, the controller 202 may be configured to reduce the operating speed of the elevator 60 (e.g., via control of the elevator motor 76) from its normal operating speed to a reduced, default speed setting. For instance, the default speed setting may correspond to an operating speed that is less than about 75% of the normal operational speed of the elevator 60 during operation within the discharge harvesting mode, such as a speed ranging from about 10% to about 50% of the normal operating speed and/or a speed ranging from about 10% to about 25% of the normal operating speed. As described above, such default speed setting may correspond to a manufacturer-defined setting and/or an operator-defined setting and may be adjustable, as desired or necessary, by the operator.

Referring still to FIG. 5, at (308), the method 300 may include blocking or covering the discharge opening defined by the storage hopper upon receipt of the operator input. Specifically, in several embodiments, when operating the harvester 10 in the storage harvesting mode, the hopper gate 102 may be configured to be moved to its storage position and the rear deflector 112 may be configured to be moved to its closed position so that the storage hopper 100 defines a storage volume 104 for receiving the billets expelled from the distal end 64 of the elevator 60. As indicated above, the controller 202 may be configured to automatically move the hopper gate 102 and the rear deflector 112 to their respective positions upon receiving the input from the operator indicating his/her desire to operate the harvester 10 in the storage harvesting mode. Such control action may be performed simultaneously with reducing the operating speed of the elevator 60 or may occur immediately before or after the elevator speed adjustment.

Additionally, at (310), the method 300 may include monitoring a crop flow parameter(s) of the harvester. For example, as indicated above, the controller 202 may be communicatively coupled to one or more crop flow sensors 204 configured to monitor an operating parameter of the harvester 10 that provides an indication of or that is otherwise associated with the crop mass flow or throughput through the harvester 10. For instance, the crow flow sensor(s) 204 may correspond to a pressure sensor(s) 230, a torque sensor(s) 234, a position sensor(s) 236, yield sensor(s) 238, and/or any other suitable sensor(s) that allows for changes in the crop mass flow or throughput through the harvester 10 to be directly or indirectly detected.

Moreover, at (312), the method 300 may include actively adjusting the operating speed of the elevator based on the crop flow parameter as the harvested crops expelled from the distal end of the elevator are being stored within a storage volume of the storage hopper. Specifically, as indicated above, the controller 202 may be configured to actively adjust the operating speed of the elevator 60 based on detected changes in the monitored crop flow parameter(s) (thereby indicating that a corresponding change in the crop mass flow has occurred). For instance, in one embodiment, the controller 202 may be configured to compare the monitored crop flow parameter to a previously determined running average for the crop flow parameter. In such an embodiment, the controller 202 may adjust the operating speed of the elevator 60 when the monitored crop flow parameter exceeds or falls below the running average (or exceeds or falls below a threshold range defined relative to the running average).

In several embodiments, the controller 202 may be configured to continue operation of the elevator 60 at the reduced operational speed(s) as the elevator 60 is moved a conveyance distance corresponding to the distance of the top elevator span. Specifically, in several embodiments, when operating in the storage discharge mode, the elevator 60 may be operated at the reduced operational speed(s) until the elevator 60 has moved one half of its total travel distance (i.e., the conveyance distance defined along the top span 70 of the elevator 60 between its proximal and distal ends 62, 64). In doing so, as the elevator 60 is moved such conveyance distance, the billets initially contained within the top elevator span 70 may be dumped into the storage volume 104 while concurrently filling the paddles 68 moving into the top elevator span 70 to their maximum fill level.

Thereafter, in one embodiment, the operation of the elevator 60 may be stopped once the elevator 60 has been moved the specified conveyance distance. Specifically, once the elevator 60 has moved the conveyance distance defined along the top span 70 of the elevator 60 between its proximal and distal ends 62, 64 (thereby allowing both the storage hopper 100 and the top elevator span 70 to be filled with billets), the elevator operation may be halted. For instance, the elevator 60 may be automatically stopped by the vehicle's controller 202 (e.g., by controlling the operation of the elevator motor 76). In such an embodiment, the controller 202 may be configured to determine when the elevator 60 has been moved the specified conveyance distance by monitoring the time across which the elevator 60 has been operated at its reduced speed and/or by monitoring the actual distance across which the elevator 60 has been conveyed.

Moreover, in one embodiment, after stopping the operation of e elevator 60, the remainder of the harvester 10 may be maintained operational to allow harvested crops to be stored within a lower storage volume of the elevator assembly 52 for a predetermined time period. Specifically, upon stopping the elevator 60, the harvester 10 may continue to be used to harvest sugar cane for a given time period (e.g., three to ten seconds). In such instance, the harvested billets may be stored within a lower storage hopper 152 (FIG. 1) defined at or adjacent to the proximal end 62 of the elevator 60. Once the predetermined time period has elapsed, the operation of the harvester 10 may be stopped. Specifically, following the continued operation of the harvester 10 for the predetermined time period after stopping the elevator 60, it may be assumed that the elevator assembly 62 is at full capacity. In such instance, the harvester 10 may be stopped to discontinue harvesting of the sugar cane.

It should be appreciated that the disclosed method 300 may allow a harvester 10 to be operated without unloading harvested crops for a significant period of time (e.g., fifteen to forty seconds depending on the throughput of the harvester 10 and the length/capacity of the elevator 60), thereby providing sufficient time to allow an external storage device (e.g., a billet cart) to be positioned relative to the harvester 10. In general, it is anticipated that the external storage device may be properly positioned relative to the harvester 10 in the time period required for the elevator 60 to be moved the conveyance distance defined along the top span 60 of the elevator 60 between its proximal and distal ends 62, 64. As such, in most instances, it is believed that the operation of the harvester 10 can be switched back to its discharge harvesting mode prior to the operation of the elevator 60 needing to be stopped. However, in the event that the external storage device is not properly positioned relative to the harvester 10 prior to such point, the above-described, follow-up operating steps may be implemented to provide for continued, temporary operation of the harvester until the eternal storage device is in place.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a harvester, the harvester comprising an elevator assembly including an elevator extending between a proximal end and a distal end, the elevator assembly further including a storage hopper positioned adjacent to the distal end of the elevator, the method comprising:

initially operating the harvester in a discharge harvesting mode such that harvested crops are conveyed from the proximal end of the elevator to the distal end of the elevator and subsequently discharged from the harvester through a discharge opening defined by the storage hopper;

upon receipt of an input associated with operating the harvester in a storage harvesting mode, reducing an operating speed of the elevator and blocking the discharge opening defined by the storage hopper; and actively adjusting the operating speed of the elevator based on a crop flow parameter of the harvester as the harvested crops expelled from the distal end of the elevator are being stored within a storage volume of the storage hopper, wherein the crop flow parameter provides an indication of a mass flow of the harvested crops through the harvester.

2. The method of claim 1, the method further comprising monitoring the crop flow parameter during operation within the discharge harvesting mode to determine an average crop flow parameter for the harvester.

3. The method of claim 2, wherein reducing the operating speed of the elevator comprises initially reducing the operating speed of the elevator to a predetermined elevator speed setting upon receipt of the operator input.

4. The method of claim 3, wherein actively adjusting the operating speed of the elevator based on the crop flow parameter comprises adjusting the operating speed of the elevator up or down from the predetermined elevator speed setting when the crop flow parameter differs from the average crop flow parameter or falls outside of a tolerance range defined relative to the average crop flow parameter.

5. The method of claim 1, wherein actively adjusting the operating speed of the elevator based on the crop flow parameter comprises increasing the operating speed of the elevator when the crop flow parameter indicates that the mass flow of the harvested crop through the harvester has increased during operation within the storage harvesting mode.

6. The method of claim 1, wherein actively adjusting the operating speed of the elevator based on the crop flow parameter comprises reducing the operating speed of the elevator when the crop flow parameter indicates that the mass flow of the harvested crop through the harvester has decreased during operation within the storage harvesting mode.

7. The method of claim 1, further comprising monitoring the crop flow parameter via at least one crop flow sensor.

8. The method of claim 7, wherein the crop flow parameter corresponds to a pressure within a hydraulic circuit of the harvester and the at least one crop flow sensor corresponds to at least one pressure sensor.

9. The method of claim 8, wherein the hydraulic circuit is associated with at least one of a base cutter assembly of the harvester, a chopper assembly of the harvester, or a feed roller assembly of the harvester.

10. The method of claim 7, wherein the crop flow parameter corresponds to a relative position of at least one feed roller of the harvester and the at least one crop flow sensor corresponds to at least one position sensor.

11. The method of claim 7, wherein the crop flow parameter corresponds to an operating torque of a rotating component of the harvester and the at least one crop flow sensor corresponds to at least one torque sensor.

12. The method of claim 2, wherein the at least one crop flow sensor corresponds to at least one yield sensor configured to provide an indication of the mass flow of the harvested crops through the harvester.

13. A system for operating a harvester in both a discharge harvesting mode and a storage harvesting mode, the system comprising:

an elevator extending between a proximal end and a distal end, the elevator configured to carry harvested crops between the proximal and distal ends of the elevator;

a storage hopper positioned adjacent to the distal end of the elevator, the storage hopper defining a discharge opening through which harvested crops are discharged from the storage hopper;

a controller configured to control an operation of the elevator, the controller including a processor and related memory, the memory storing instructions that, when implemented by the processor, configure the controller to:

initially operate the elevator while in the discharge harvesting mode such that harvested crops are conveyed from the proximal end of the elevator to the distal end of the elevator and subsequently discharged through the discharge opening defined by the storage hopper;

upon receipt of an input associated with adjusting operation from the discharged harvesting mode to the storage harvesting mode, reduce an operating speed of the elevator and block the discharge opening defined by the storage hopper; and actively adjust the operating speed of the elevator based on a crop flow parameter associated with the harvested crops as the harvested crops expelled from the distal end of the elevator are being stored within a storage volume of the storage hopper, wherein the crop flow parameter provides an indication of a mass flow of the harvested crops.

14. The system of claim 13, wherein the controller is configured to monitor the crop flow parameter during operation within the discharge harvesting mode to determine an average crop flow parameter for the harvested crops.

15. The system of claim 14, wherein the controller is configured to adjust the operating speed of the elevator up or down from a predetermined elevator speed setting for the storage harvesting mode when the crop flow parameter differs from the average crop flow parameter or falls outside of a tolerance range defined relative to the average crop flow parameter.

16. The system of claim 13, wherein the controller is configured to increase the operating speed of the elevator when the crop flow parameter indicates that the mass flow of the harvested crops has increased during operation within the storage harvesting mode.

17. The system of claim 13, wherein the controller is configured to reduce the operating speed of the elevator when the crop flow parameter indicates that the mass flow of the harvested crops has decreased during operation within the storage harvesting mode.

18. The system of claim 13, further comprising at least one crop flow sensor communicatively coupled to the controller, the at least one crop flow sensor configured to monitor the crop flow parameter.

19. The system of claim 18, wherein the at least one crop flow sensor comprises at least one of a pressure sensor, a torque sensor, a position sensor, or a yield sensor.

20. The system of claim 19, wherein the at least one crop flow sensor comprises at least one pressure sensor, the at least one pressure sensor configured to monitor a pressure within a hydraulic circuit associated with at least one of a base cutter assembly of the harvester, a chopper assembly of the harvester, or a feed roller assembly of the harvester.

* * * * *